(12) United States Patent
Sakamoto

(10) Patent No.: US 6,882,600 B2
(45) Date of Patent: Apr. 19, 2005

(54) CARRIAGE SERVO CONTROL SYSTEM AND INFORMATION-RECORDING MEDIUM IN WHICH PROGRAM FOR CARRIAGE SERVO CONTROL IS RECORDED

(75) Inventor: Masato Sakamoto, Kawagoe (JP)

(73) Assignee: Pioneer Corporation, Tokyo-To (JP)

( * ) Notice: Subject to any disclaimer, the term of this patent is extended or adjusted under 35 U.S.C. 154(b) by 163 days.

(21) Appl. No.: 09/972,441

(22) Filed: Oct. 4, 2001

(65) Prior Publication Data

US 2002/0041543 A1 Apr. 11, 2002

(30) Foreign Application Priority Data

Oct. 6, 2000 (JP) ..................................... P2000-307602

(51) Int. Cl.[7] ................................................ G11B 7/00
(52) U.S. Cl. ............................. 369/44.25; 369/44.27; 369/30.17
(58) Field of Search ........................... 369/44.27, 44.28, 369/44.29, 44.25, 30.1, 30.17, 44.26

(56) References Cited

U.S. PATENT DOCUMENTS

| | | | |
|---|---|---|---|
| 4,748,608 A | 5/1988 | Matsumoto et al. | ......... 369/43 |
| 4,899,325 A | 2/1990 | Katsuhara et al. | ............ 369/32 |
| 5,168,398 A | 12/1992 | Kanda et al. | ............. 360/78.04 |
| 5,422,867 A * | 6/1995 | Hamaguchi et al. | .......... 369/32 |
| 5,761,164 A | 6/1998 | Abe et al. | ................ 369/44.36 |
| 5,926,445 A | 7/1999 | Sasaki et al. | ............ 369/44.25 |
| 6,134,196 A | 10/2000 | Sato et al. | ............... 369/44.27 |
| 2002/0041544 A1 | 4/2002 | Sakamoto et al. | ....... 369/44.27 |

FOREIGN PATENT DOCUMENTS

JP 07-192416 7/1995

* cited by examiner

*Primary Examiner*—Nabil Hindi
(74) *Attorney, Agent, or Firm*—Ladas & Parry LLP

(57) ABSTRACT

For reproducing information recorded on an optical disc, a pickup is used to detect a target track on the disc through an optical beam. In carriage servo control, movement of the pickup is servo-controlled in the radial direction of the optical disc. In this control, a tracking error signal is produced by a preamplifier. A pulse signal is produced, in which the period of the pulse signal is set to a constant amount corresponding to the accuracy of movement of the pickup. The duty ratio of the pulse signal is changed based on characteristic of the error signal, so that a changed pulse signal is produced. The changed pulse signal is multiplied by the tracking error signal, so that a carriage control signal is produced. The carriage control signal is supplied to a carriage motor by a driver, so that the pickup is moved.

21 Claims, 7 Drawing Sheets

CARRIAGE SERVO CONTROL SYSTEM AND INFORMATION-RECORDING MEDIUM IN WHICH PROGRAM FOR CARRIAGE SERVO CONTROL IS RECORDED

BACKGROUND OF THE INVENTION

1. Field of the Invention

The present invention relates to a carriage servo control system and an information-recording medium in which a program for carriage servo control is recorded. More particularly, the present invention relates to a carriage servo control system for servo-controlling movement of a carriage that comprises a pickup operative to optically record/reproduce information on/from a recording medium such as an optical disc, and to an information-recording medium in which the carriage servo control program for controlling the movement of the carriage is recorded.

2. Description of the Related Art

Generally, when recording/reproducing information on/from an optical disc, such as a CD (compact disc), a DVD (digital versatile disc; which is an optical disc having a recording capacity that is several times larger than a conventional compact disc), by transmitting an optical beam to the optical disc, it is necessary to carry out various types of servo control to exactly record/reproduce information on/from the optical disc.

More specifically, the various types of servo control include a focus servo control, a tracking servo control and a spindle servo control. Of these, the focus servo control is executed to cancel an error between a focus position of an optical beam and the position of a target track now under use for recording/reproducing the information on/from the optical disc. In this case, the error is detected in the direction vertical to the information record surface of the optical disc. The tracking servo control is executed to cancel an error between a focus position of an optical beam and the position of a target track in a direction parallel to the information record surface, that is, the radial direction of the optical disc. The spindle servo control is executed to exactly rotate the optical disc.

Both of the focus servo control and the tracking servo control are carried out by individually moving an object lens which focuses an optical beam on a target track in the vertical direction to the information record surface or the parallel direction parallel thereto. In order to make progress a recording/reproducing operation under the rotation of the optical disc on which the tracks are spirally formed, it is necessary to move the beam's focus position (radiated position) beyond a movable range of the object lens in the parallel direction. In this case, it is further necessary to move in the radial direction the whole pickup unit including a semiconductor laser for generating the optical beam, the objective lens, a photo acceptance unit for accepting the reflected beam of the optical beam, and others. That is, carriage servo control must be needed.

One type of the conventional carriage servo control is explained with reference to FIGS. 7(A) and 7(B). FIG. 7(A) is a block diagram showing a carriage serve control system for executing one mode of the conventional carriage servo control, while FIG. 7(B) is an operating waveform diagram of the conventional carriage servo control system.

As shown in FIG. 7(A), in the conventional carriage servo control system, a tracking error signal TE showing the error between an optical beam's radiated position and a target track position in the radial direction is used. Concretely, the tracking error signal TE is produced on the basis of a reflected beam from the information-recorded surface using a technique, such as a three-beam method or a heterodyne method.

The conventional carriage servo control system usually comprises a tracking equalizer 3, a carriage equalizer 19, a comparator 5, a switch 4, a driver 7c and a carriage motor 8, all of which operate as follows. The tracking equalizer 3 executes phase compensation on the produced tracking error signal TE. The carriage equalizer 19 executes gain adjustment as well as phase compensation on an output signal A from the tracking equalizer 3 for the carriage servo control. The comparator 5 compares an output signal B from the carriage equalizer 19 with a reference voltage Vz. The switch 4 operates to turn the output signal B from the carriage equalizer 19 on and off according to a signal supplied from the comparator as a switch control signal. Further, the driver 7c amplifies in current an output signal C coming from the switch 4. Still further, the carriage motor 8 rotationally drives a shaft 12 connected to a carriage (not shown) on which the pickup is mounted so that the carriage is movable together with the pickup in the radial direction.

The operation of the conventional carriage servo control system will now be explained.

First, while the tracking servo control is executed (that is, a beam's radiated position and a target track position in the radial direction agree with each other), the optical disc is rotated while being subjected to the spindle control.

Under such a condition, a not shown tracking coil, which is configured to move the objective lens in the radial direction, is driven so that the objective lens follows the spiral track in the radial direction.

In order to move the objective lens beyond its movable range in the radial direction, it is necessary to drive the carriage motor 8 to shift the pickup by only several tracks in the radial direction. The output signal A shown at the top in FIG. 7(B) is fluctuated in response to fluctuations in the tracking error signal TE, which are caused due to movements of both the objective lens and the pickup. That is, both of the tracking servo control and the carriage servo control cause the tracking error signal TE (output signal A) to be linearly changed, with pulsated, responsively to movements of the objective lens in the radial direction. The pulsation of the signal TE results from eccentric motions of the optical disc. When the objective lens reaches a limit position of its movable range, the sign of the tracking error signal TE is reversed by the movement of the whole pickup in the radial direction (the movement thereof on the basis of the carriage servo control). Thus, the linear change of the tracking error signal TE is started again.

The carriage equalizer 19 passes low frequency components of the output signal A, so that the output signal A is converted into the output signal B suitable for the carriage motor 8 (refer to the second from the top in FIG. 7(B)).

Because the tracking error signal TE gradually changes as the objective lens follows up the spiral track, the output signal B exceeds a standard voltage Vz in the comparator 5 at a certain time. The foregoing switch control signal is thus supplied to the switch 4.

The output signal B from the carriage equalizer 19 is turned on or off by the switch 4 responding to the switch control signal. Hence the output signal C with the waveform shown at the bottom in FIG. 7(B) is supplied to the driver 7c as a drive signal. The drive signal is amplified by the driver 7c, and then supplied to the carriage motor 8.

Likewise, a series of operations stated above are repeated. Therefore, whenever the lower frequency component of the tracking error signal TE exceeds the reference voltage Vz due to the fact that the position of the objective lens inside the pickup is moved by the tracking servo control, the carriage motor 8 is intermittently driven.

However, there is a problem that the operation of the conventional carriage servo control system is still unsatisfactory in terms of a stable servo operation. To be specific, the carriage servo control system is greatly affected by fluctuations in voltage on account of eccentric motions of the optical disc (the pulsated components shown in FIG. 7(B)). This affection results in an unstable servo operation.

Moreover, because the carriage motor 8 is driven by the drive signal including the fluctuated components corresponding to the eccentric motions of the optical disc, the operations of the carriage motor 8 themselves are unstable. In other words, in FIG. 7(B), when the output signal B on which the fluctuated components are overlapped is outputted from the carriage equalizer 19 (refer to the second from the top in FIG. 7(B)), the fluctuated components are directly reflected in the drive signal (output signal C). The drive power supplied to the carriage motor 8 corresponds to an integral value of the drive signal, which is shown by hatched portions in the bottom in FIG. 7(B). Thus, the fluctuated components corresponding to the eccentric motions of the optical disc are included in the drive signal, the integral values are also subject to changes, with the result that the drive signal of constant amplitude will not be supplied to the carriage motor 8 with a stable manner. In addition, there are some cases in which the drive signal is split into several signal parts, as shown by the first pulse at the bottom in FIG. 7(B). This split, if happens, also gives unstable operations to the carriage motor 8.

Furthermore, the integral values also change by irregularities in characteristics of the carriage equalizer 19 as well as those of the carriage motor 8.

The foregoing various types of fluctuated components (irregularities), therefore, cause the carriage servo control system not to operate precisely, differently from the designed specifications, so that unstable operations are still left in the carriage servo control system. Further, to suppress such irregularities requires the specifications of the carriage servo control system be redesigned. This remarkably lowers degrees of freedom in designing the whole carriage servo control system, thereby greatly narrowing applications of the carriage servo control system. Additionally, there occurs a problem that the redesign for suppressing the irregularities increases the number of steps of the design itself.

SUMMARY OF THE INVENTION

The present invention is made to overcome the foregoing problems. Accordingly, it is an object of the present invention to provide a carriage servo control system and an information-recording medium in which a program for carriage servo control is recorded, which are capable of (1): not only executing carriage servo control exactly based on in its designed specifications, but also improving degrees of freedom in designing the carriage servo control system, thereby decreasing the number of steps of the design, thereby simplifying the design for desired carriage servo control, and (2): satisfying a wide range of applications.

The drive signal for driving the carriage means is produced on the basis of the changed periodic signal and the error signal, and then the drive signal is supplied to the moving means. An amount of energy applied to move the carriage means can be controlled substantially based on designed specifications. The influence of irregularities in movement control carried out by the carriage means can be reduced and degrees of freedom in designing carriage servo control can be improved.

The carriage servo control system can be provided, which is capable of not only executing carriage servo control exactly based on in its designed specifications, but also improving degrees of freedom in designing the carriage servo control system, thereby decreasing the number of steps of the design, thereby simplifying the design for desired carriage servo control, and satisfying a wide range of applications.

Because the changed periodic signal whose duty ratio is adjusted on the basis of characteristics of the error signal is produced, the carriage servo control can be made in a more optimum state.

The changed periodic signal is used which is produced with its duty ratio altered correspondingly to a difference between maximum and minimum values of the error signal. The carriage servo control can therefore be made in a more optimum state.

The drive signal is produced using the periodic signal from which higher frequency components attributable to vibrations occurring during movement of the carriage means are eliminated. This enables movement of the carriage means to be controlled more precisely.

The drive signal is produced according to the partial error signal and the changed periodic signal, and then supplied. This eliminates the necessity of a constant application of the drive signal, thereby preventing power consumption of the carriage servo control system from increasing.

The changed periodic signal is multiplied by the partial error signal so that the drive signal is produced. It is therefore possible to yield the drive signal with the simplified configuration.

The drive signal is produced based on the partial changed periodic signal and the error signal, and then supplied. This eliminates the necessity of a constant application of the drive signal, thereby preventing power consumption of the carriage servo control system from increasing.

The partial changed periodic signal is multiplied by the error signal so that the drive signal is produced. It is therefore possible to yield the drive signal with the simplified configuration.

The computer functions in such a manner that the drive signal for driving the carriage means is produced on the basis of both of the changed periodic signal and the error signal, and then the produced drive signal is supplied to the moving means. An amount of energy applied to move the carriage means can be controlled substantially based on designed specifications. The influence of irregularities in movement control carried out by the carriage means can be reduced and degrees of freedom in designing carriage servo control can be improved.

Accordingly, the carriage servo control system can be provided, which is capable of not only executing carriage servo control exactly based on in its designed specifications, but also improving degrees of freedom in designing the carriage servo control system, so as to decrease the number of steps of the design, thereby simplifying the design for desired carriage servo control, and satisfying a wide range of applications.

Further, the computer acts in such a way that the drive signal is produced using the changed periodic signal whose duty ratio is adjusted correspondingly to characteristics of the error signal. The carriage servo control is done in a more optimized state.

BRIEF DESCRIPTION OF THE DRAWINGS

Other objects and aspects of the present invention will become apparent from the following description of embodiments with reference to the accompanying drawings in which.

DETAILED DESCRIPTION OF THE PREFERRED EMBODIMENTS

Preferred embodiments of the present invention will now be described hereinafter with reference to the accompanying drawings.

In the embodiments described hereinafter, the present invention is applied to carriage servo control adopted by an information reproducing system that optically reproduces information recorded on an optical disc, such as a CD, a DVD, or others.

(I) Embodiment of Information Reproducing System

Figure 1:
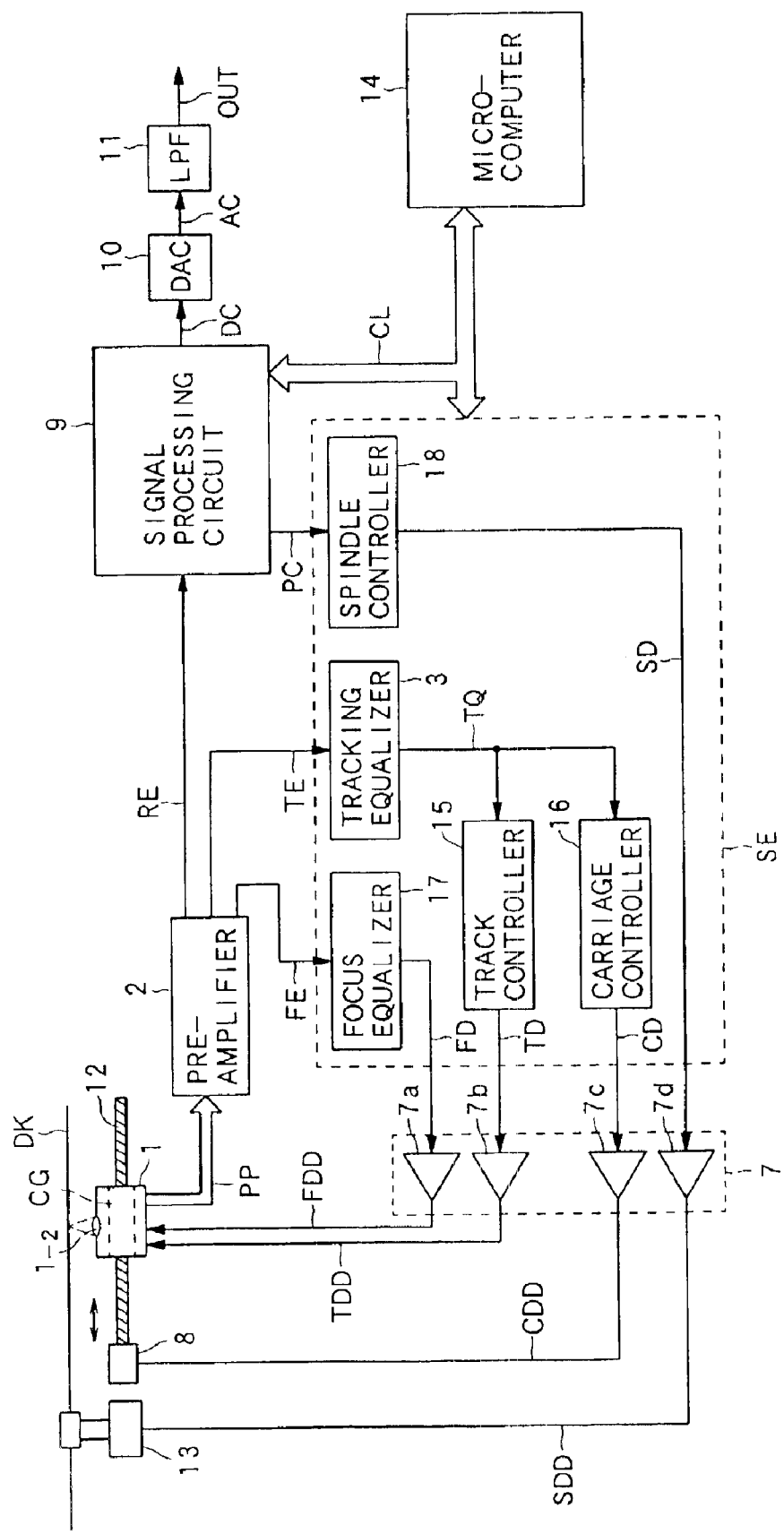
FIG. 1 is a block diagram showing a schematic configuration of an information reproducing system of embodiments according to the present invention.

First, the entire configuration and operations of the information reproducing system according to this embodiment are explained by using FIG. 1. FIG. 1 is a block diagram showing a schematic configuration of the information reproducing system.

As shown in FIG. 1, the information reproducing system S according to the embodiment comprises a pickup 1 serving as detecting means, a preamplifier 2 serving as error signal producing means, a driver unit 7 serving as supplying means, and a carriage motor 8 serving as moving means. This information reproducing system S also comprises a signal processing circuit 9, a digital-to-analog converter (D/A converter) 10, a low-pass filter 11, a shaft 12 rotated by the carriage motor 8, a spindle motor 13, a microcomputer 14 and a servo equalizer unit SE according to the present invention. Of these, the detecting means includes a lens $1_{-2}$ that operates to focus an information-reproducing optical beam on an information-recorded surface of an optical disc DK. Moreover, the driver unit 7 has four drivers 7a to 7d.

The servo equalizer unit SE includes a tracking equalizer 3, a tracking controller 15, a carriage controller 16 configured according to the present invention, a focus equalizer 17, and a spindle controller 18.

The pickup 1 is mounted on a carriage CG as carriage means, which has a female thread engaged with a male thread formed on the shaft 12. When the shaft 12 is rotated responsively to rotation of the carriage motor 8, the carriage CG moves in the right-and-left direction in FIG. 1, which substantially corresponds to the parallel direction to the information-recorded surface. This configuration allows carriage servo control described later to be executed.

Operations of the information reproducing system S will now be described with respect to reproducing information from the optical disc DK.

For reproducing information, an information-reproducing optical beam, whose intensity is constant, is first radiated from a not-shown semiconductor laser that is contained in the pickup 1. The radiated optical beam is then focused by the lens $1_{-2}$ on a desired target track formed on the information-recorded surface (not shown) of the optical disc DK.

The beam reflected from the target track is accepted by a not-shown detector which is contained in the pickup 1, so that a detection signal PP corresponding to the intensity of the accepted reflection beam is produced, and then sent to the preamplifier 2.

The preamplifier 2, on the basis of the produced detection signal PP, produces various signals. Those signals include a reproduced signal RE on information recorded on the target track, a focus error signal FE showing an error between a focus position of the optical beam and the target track position in a direction vertical to the information-recorded surface. The signals further include a tracking error signal TE showing an error between the focus position of the optical beam and the target track position in a radial direction of the optical disc DK. The preamplifier 2 sends the reproduced signal RE to the signal processing unit 9, the focus error signal FE to the focus equalizer 17, and the tracking error signal TE to the tracking equalizer 3, respectively. In the preamplifier 2, the tracking error signal TE is produced by means of a known technique, such as the three-beam method, heterodyne method, or others. Additionally, the focus error signal FE is produced in cases the target track position in the direction vertical to the information-recorded surface is fluctuated or the focus position of the optical beam in the vertical direction is fluctuated. That is, the waveform of the focus error signal FE corresponds to a sigmoidal curve.

The signal processing circuit 9 receives/transmits control information CL from/to the microcomputer 14, during which time it acts as follows. More specifically, the signal processing circuit 9 performs predetermined decoding on the reproducing signal RE so as to produce a decoded signal DC corresponding to the information recorded on the target track, thereby providing the produced decoded signal DC to the D/A converter 10. The signal processing circuit 9 also produces a spindle control signal PC showing an error in the number of rotations of the optical disc DK on the basis of a synchronous signal included in the reproduced signal RE. This results in that the spindle control signal PC is supplied to the spindle controller 18.

Therefore, this enables the spindle controller 18 to receive the spindle control signal PC and produce a rotation control signal SD for offsetting the error in the number of rotations on the basis of the received spindle control signal PC. The rotation control signal SD is output to the driver 7*d* arranged in the driver unit 7.

The driver 7*d* receives the rotation control signal SD to amplify the signal SD. The driver 7*d* also produces a spindle drive signal SDD for actually driving and controlling the number of rotations of the spindle motor 3 on the basis of the amplified spindle control signal PC. To accomplish such drive and operation, the spindle drive signal SDD is sent to the spindle motor 13.

After this output operation from the driver 7*d*, the spindle motor 13 is rotationally driven in response to the spindle drive signal SDD. Hence as an error in the number of rotations is gradually eliminated (that is, under the spindle servo control), the optical disc DK is finally brought into the state where it rotates at a predetermined number of rotations.

On the other hand, the D/A converter 10 receives the decoded signal DC, and then converts the received decoded signal DC into an analog decoded signal. Then the analog decoded signal AC is sent to the low-pass filter 11.

The low-pass filter 11 eliminates noise components and others of which frequency band is high, which are included in the analog decoded signal AC, then produces an output signal OUT corresponding to the information recorded on the target track of the optical disc DK. This output signal OUT is provided to an output device, such as an outside display apparatus, a speaker, or others, which is not shown in FIG. 1, though.

On the other hand, the focus equalizer 17, which is disposed in the servo equalizer SE to which the focus error signal FE is given, executes phase compensation of the inputted focus error signal FE. And the focus equalizer 17 produces a focus control signal FD to offset an error between the focus position of the optical beam and the target track position in the direction vertical to the information recorded surface. The focus control signal FD is supplied to the driver 7*a* disposed in the driver unit 7.

The driver 7*a* amplifies the focus control signal FD to produce a focus drive signal FDD for actually driving and controlling a not-shown focus actuator disposed in the pickup 1. Specifically, the focus actuator is configured to move the lens $1_{-2}$ in the vertical direction to the information-recorded surface, so that the focus position of the optical beam is moved in the vertical direction. Then the produced focus drive signal FDD is given to the pickup 1.

After the above operation, the focus actuator is driven according to the focus drive signal FDD, which will lead to execution of the focus servo control that offsets positional errors in the vertical direction.

Moreover, the tracking equalizer 3, which is disposed within the servo equalizer SE to which the tracking error signal TE is given, executes phase compensation of the inputted tracking error signal TE, and then produces a tracking equalizer signal TQ. This signal TQ is used to offset an error between the focus position of the optical beam and the target track position in the direction parallel to the information-recorded surface. The produced tracking equalizer signal TQ is given to both of the track controller 15 and the carriage controller 16. The waveform of the tracking equalizer signal TQ is for example similar to that of the output signal B shown in FIG. 7(B).

This permits the track controller 15 to receive the tracking equalizer signal TQ and to execute a predetermined waveform conversion processing and a gain adjustment on the received tracking equalizer signal TQ. This leads to production of a tracking control signal TD used for tracking servo control to offset an error occurring in the horizontal direction. The thus produced tracking control signal TD is provided to the driver 7*b* arranged in the driver unit 7.

The driver 7*b* amplifies the tracking control signal TD, and then produces a tracking drive signal TDD used for actually driving and controlling a not-shown tracking actuator disposed in the pickup 1. This actuator is configured to move the lens $1_{-2}$ in the parallel direction to the information-recorded surface to move the focus position of the optical beam in the parallel direction. The tracking drive signal TDD is then provided to the pickup 1.

The above operation causes the track actuator to be driven in response to the tracking drive signal TDD, with the result that the tracking servo control for offsetting a positional error in the parallel direction is executed.

The carriage controller 16 according to the present invention, to which the tracking equalizer signal TQ is given, executes, on the tracking equalizer signal TQ, later-described waveform transformation processing according to the present invention and other types of processing. The carriage controller 16 produces the carriage control signal CD for executing carriage servo control, and then supplies it to the driver 7*c* placed in the driver unit 7. The carriage servo control is directed to offset of an error in the parallel direction, which is not completely offset by only the movement of the lens $1_{-2}$, and to following up of a focus position (radiated position) of the optical beam toward the target track.

The driver 7*c* then amplifies the carriage control signal CD, and then produces a carriage drive signal CDD for actually driving and controlling the carriage motor 8. The thus produced carriage drive signal CDD is given to the carriage motor 8.

Then the carriage motor 8 rotates responsively to the carriage drive signal CDD, then its axis 12 further rotates in answer to the rotation of the motor 8. This causes the carriage CG to be moved right and left in FIG. 1, substantially corresponding to the parallel direction to the information-recorded surface. Accordingly, it is possible to offset positional errors in the parallel direction and to execute the carriage servo control, with the radiated position moved.

(II) First Embodiment of Carriage Controller

Figure 2:
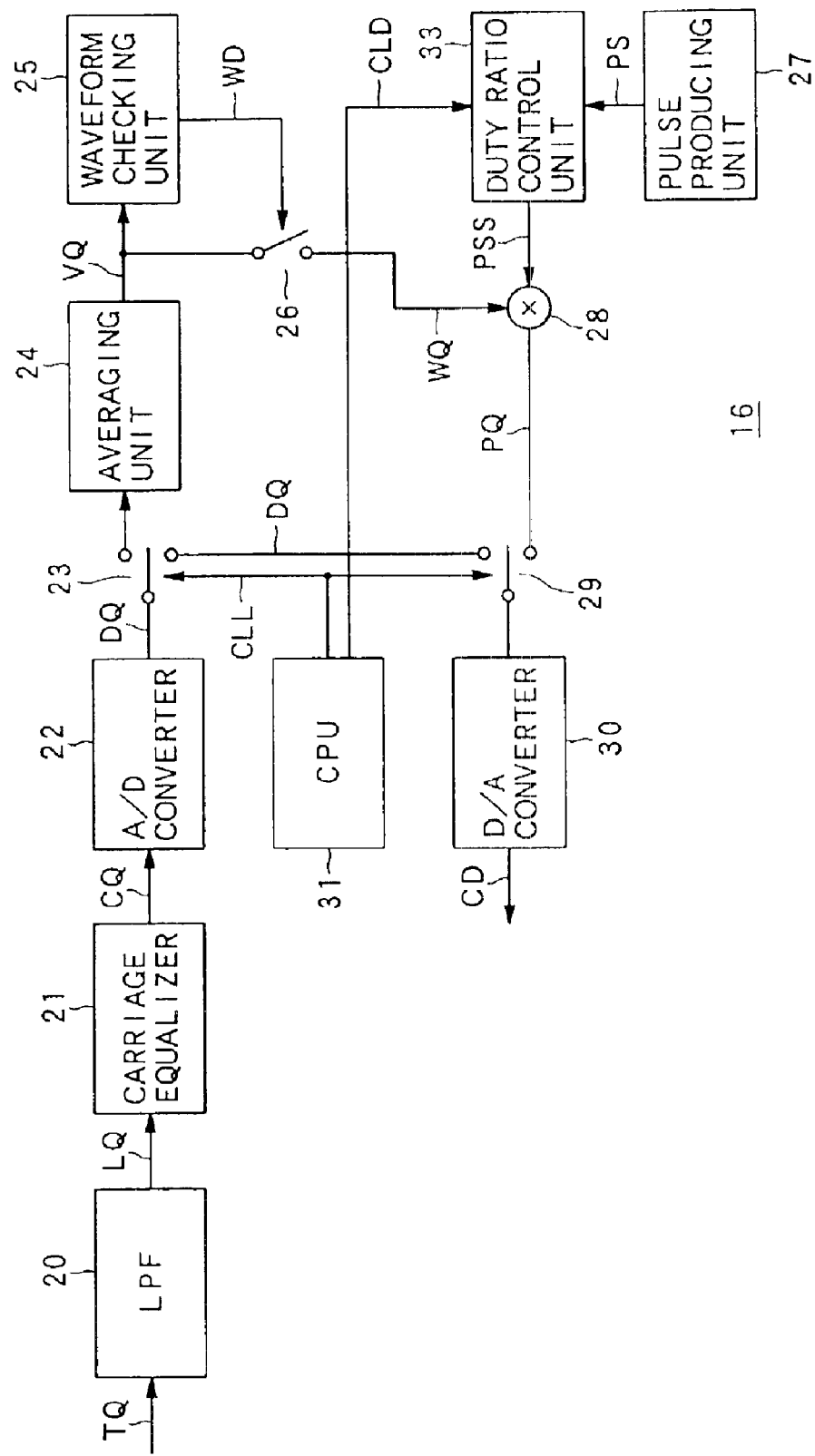
FIG. 2 is a block diagram showing a schematic configuration of a carriage controller of the first embodiment according to the present invention.
Figure 3:
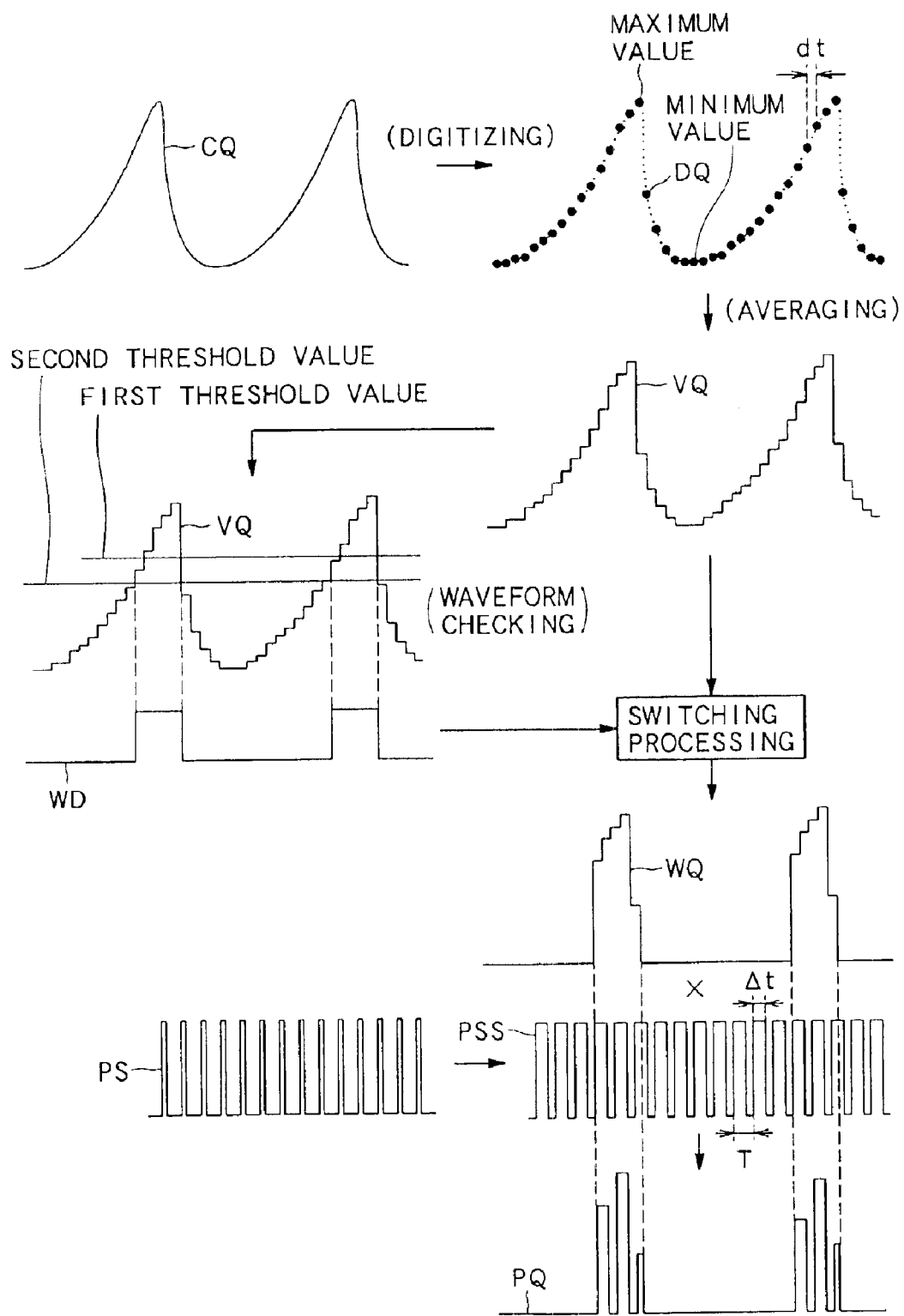
FIG. 3 represents waveform diagrams showing operations of the carriage servo controller according to the first embodiment.

The first embodiment of the carriage controller 16 according to the present invention will now be explained using FIGS. 2 and 3. FIG. 2 is a block diagram showing a schematic configuration of the carriage controller 16 of the first embodiment, while FIG. 3 is a waveform diagram showing operations of the carriage controller 16.

As shown in FIG. 2, the carriage controller 16 according to the first embodiment is provided with a low-pass filter 20, a carriage equalizer 21, an analog-to-digital converter (A/D converter) 22, switches 23, 26 and 29. The carriage controller 16 is further provided with an averaging unit 24, a waveform checking unit 25, a pulse producing unit 27 serving as periodic signal producing means, a multiplier 28 serving as drive signal producing means, a D/A converter 30, a central processing unit (CPU) 31, and a duty ratio control unit 33 serving as duty ratio control means.

Practically, the low-pass filter 20, the carriage equalizer 21, the A/D converter 22, the switch 23, the averaging unit 24, and the waveform checking unit 25 are disposed to sequentially be connected in order. Particularly, the switch 23 is connected to the CPU 31 so that its input terminal is selectively switched over between its two output terminals responsively to a control signal CLL coming from the CPU 31. Supplied to the input terminal is the output signal (digital equalizer signal DQ) coming from the A/D converter 22. Of the two output terminals, the first output terminal is connected to the averaging unit 24, whilst the second one is connected to the first input terminal of the switch 29.

Moreover, the pulse producing unit 27, the duty ratio control unit 33, the multiplier 28, the switch 29, and the D/A converter 30 are provided so that they are sequentially connected in order. The switch 26 is operative to turn on and off an output signal (averaged equalizer signal VQ) from the averaging unit 24 to the multiplier 28 in response to a switching control signal (window signal WD) coming from the waveform checking unit 25.

In addition, the switch 29 is connected to the CPU 31 so that its output terminal, which connects to the D/A converter 30, is switched over selectively between its two input terminals. The first input terminal is connected to the second output terminal of the foregoing switch 23, while the second input terminal is connected to the multiplier 28. This switching is carried out responsively to the control signal CLL coming from the CPU 31.

Operations of the foregoing respective units will now be explained using FIG. 3, in which waveform diagrams showing individual units are depicted.

In this embodiment, under execution of the normal carriage servo control, the control signal CLL from the CPU 31 causes both the switches 23 and 29 to make a switching operation as follows. The input terminal of the switch 23 is switched over to its first output terminal connecting to the averaging unit 24, and output terminal of the switch 29 is switched over to its second input terminal connecting to the multiplier 29.

Figure 7A:
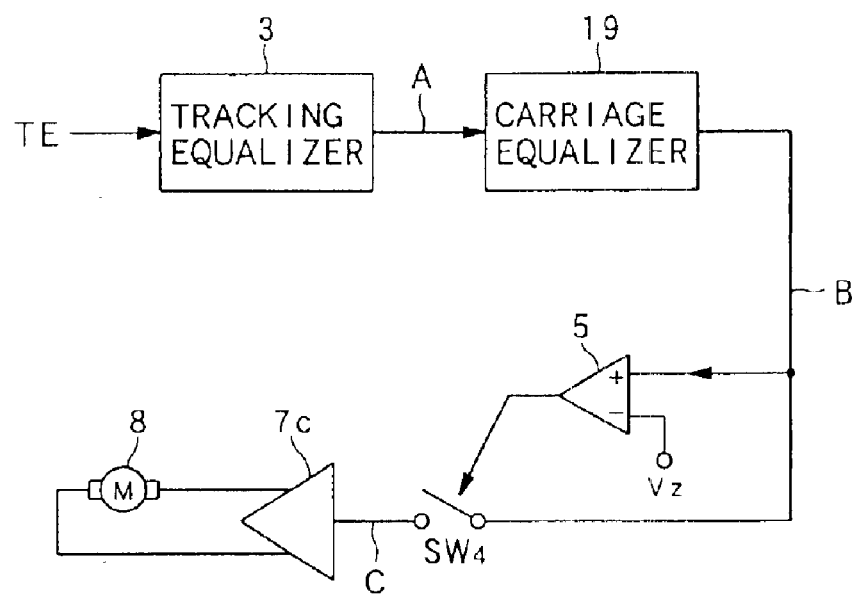
FIG. 7(A) is a block diagram showing a conventional carriage serve control system.
Figure 7B:
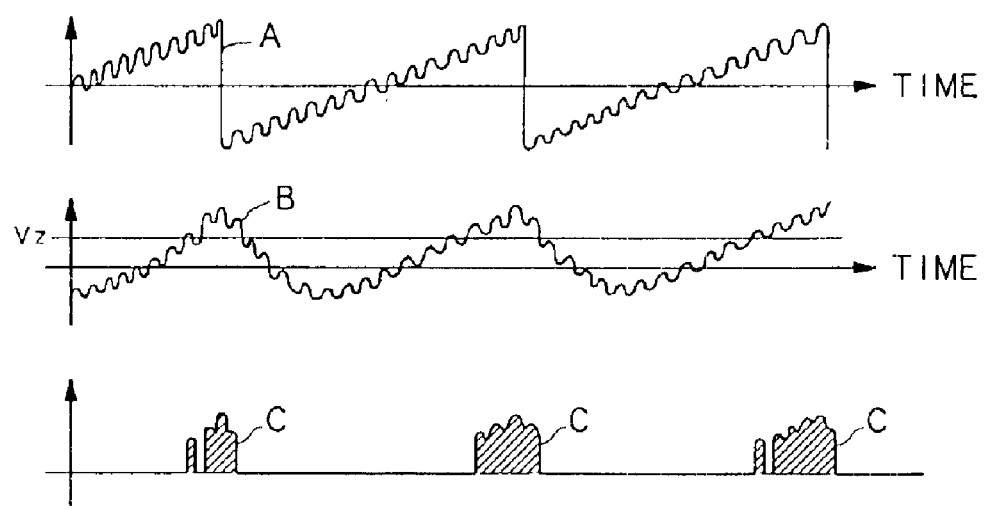
FIG. 7(B) is an operating waveform diagram of the conventional carriage servo control system.

At first, the low-pass filter 20 eliminates pulsated components included in the tracking equalizer signal TQ, which are pulsated components due to the eccentric of the optical disc DK (refer to pulsated components shown in the output signal B in FIG. 7(B)), and then produces a lower-band equalizer signal LQ. This signal LQ is sent to the carriage equalizer 21.

The carriage equalizer 21 then executes predetermined gain adjustment and phase compensation on the lower-band equalizer signal LQ so that a carriage equalizer signal CQ is produced. This produced carriage equalizer signal CQ is provided to the A/D converter 22. The waveform over two periods of the carriage equalizer signal CQ is shown at the middle left in FIG. 3.

The A/D converter 22 receives the carriage equalizer signal CQ, then digitizes the received carriage equalizer signal CQ according to a sampling period dt, with the result that the digital equalizer signal DQ is produced. The waveform of the signal DQ is shown over its two periods at the middle right in FIG. 3. The A/D converter 22 supplies the produced digital equalizer signal DQ to both of the CPU 31 and, through the switch 23, the averaging unit 24.

The CPU 31 then detects the maximum and minimum values of the digital equalizer signal DQ within one period thereof (refer to the waveform shown at the top right in FIG. 3), and produces a control signal CLD on the basis of the maximum and minimum values. The control signal CLD, which is used, as described later, to change a duty ratio of a pulse signal PS, is given to the duty ratio control unit 33.

In producing the control signal CLD, the CPU 31 applies a predetermined function to a difference Vm between the maximum and minimum values, then uses a result of the application so as to produce the control signal CLD for controlling the duty ratio. A more concrete example is described as follows. As exemplified at the second waveform (right one) from the bottom in FIG. 3, when taking each period of "HIGH" of a later-described change pulse signal PSS as Δt, the CPU 31 calculates the Δt according to the following expression (1).

$$\Delta t = (C/Vm) + B \qquad (1)$$

where the reference B and the C are constants. The CPU 31 produces the control signal CLD using the calculated Δt, and then provides the produced control signal CLD to the duty ratio control unit 33.

The averaging unit 24 averages the digital equalizer signal DQ over a predetermined averaging period in order to produce an averaged equalizer signal VQ, whose waveform for two periods is shown at the second from the top right in FIG. 3. The averaged equalizer signal VQ is sent to both of the switch 26 and the waveform checking unit 25.

The waveform checking unit 25 produces, as shown at the second from the top left in FIG. 3, a window signal WD that becomes "HIGH" only during each period in which the averaged equalizer signal VQ exceeds specified signal values. Those signal values exist in a range of not more than a predetermined first threshold value and not less than a predetermined second threshold value. The window signal WD is exemplified at the third from the top left in FIG. 3. The waveform checking unit 25 sends the produced window signal WD to the switch 26 as a control signal for controlling the open and close of the switch 26.

Both the first and second threshold values are previously determined so that the window signal WD becomes "HIGH" only during the predetermined interval of time in which the carriage motor 8 is driven within one period of the averaged equalizer signal VQ. In addition, the reason why the two threshold values are used is to prevent the window signal WD from being fluctuated. That is, in cases the threshold value compared to the averaged equalizer signal VQ is one in number, intervals of time in which the window signal WD becomes "HIGH" are apt to be fluctuated in shorter periods.

The switch 26, to which the window signal WD is supplied as the switching control signal, executes switching processing so as to pass the averaged equalizer signal VQ only during each period in which the window signal WD is "HIGH." Thus, a switching equalizer signal WQ shown at the third from the top right in FIG. 3 is produced, which is sent to one input terminal of the multiplier 28.

On the other hand, the pulse producing unit 27 continuously produces a pulse signal PQ whose period of time T is constant and whose duty ratio is also constant (refer to the bottom left in FIG. 3). The constant period T is previously determined such that the carriage motor 8 is driven in a stabilized manner and under the state based on designed specifications. The period of the pulse signal PS is sufficiently shorter than one period of the averaged equalizer signal VQ and corresponds to operating characteristics of a feed mechanism of the carriage CG in which the carriage motor 8 and the shaft 12 are disposed. The pulse producing unit 27 provides the duty ratio control unit 33 with the produced pulse signal PS.

When receiving the outputted pulse signal PS, the duty ratio control unit 33 changes the duty ratio of the pulse signal PS with its period T constant (refer to the second waveform from the bottom right in FIG. 3) in response to the control signal CLD from the CPU 31. Specifically, the duty ratio control unit 33 changes the Δt shown in the second waveform from the bottom right in FIG. 3 in such a manner that the Δt equals an amount represented by the control signal CLD. This control of change produces a changed pulse signal PSS, which is sent to the other input terminal of the multiplier 28.

The multiplier 28 receives the switching equalizer signal WQ through its one input terminal and the changed pulse signal PSS through its other input terminal. In response to this reception, the multiplier 28 multiplies the switching equalizer signal WQ and the changed pulse signal PSS together so as to produce a pulse carriage signal PQ shown at the bottom right in FIG. 3. The produced pulse carriage signal PQ is sent to the D/A converter 30 through the switch 29. In this situation, the pulse carriage signal PQ equals in the duty ratio the changed pulse signal PSS.

The D/A converter 30 converts the pulse carriage signal PQ into an analog signal to make the foregoing carriage control signal CD, before outputting the carriage control signal CD to the driver 7c.

The carriage control signal CD is therefore amplified by the driver 7c to produce the foregoing carriage drive signal CDD, so that the carriage motor 8 is driven and controlled on the basis of the carriage drive signal CDD.

By way of example, the changing processing of the duty ratio of the changed pulse signal PSS is carried out one time by both the CPU 31 and the duty ratio control unit 33 before the start of reproduction. And in the reproduction, the carriage drive signal CDD is produced using the changed pulse signal PSS of which duty ratio is changed by the changing processing. In such a case, it is possible to optimize the duty ratio for the information reproducing system S, whenever the reproduction is conducted.

Alternatively, it is possible to configure the carriage equalizer 16 so that the CPU 31 and the duty ratio control unit 33 operate to constantly change the duty ratio during the execution of the reproduction. This configuration makes it possible to perform the carriage servo control more precisely and stably.

(III) Second Embodiment of Carriage Controller

Figure 4:
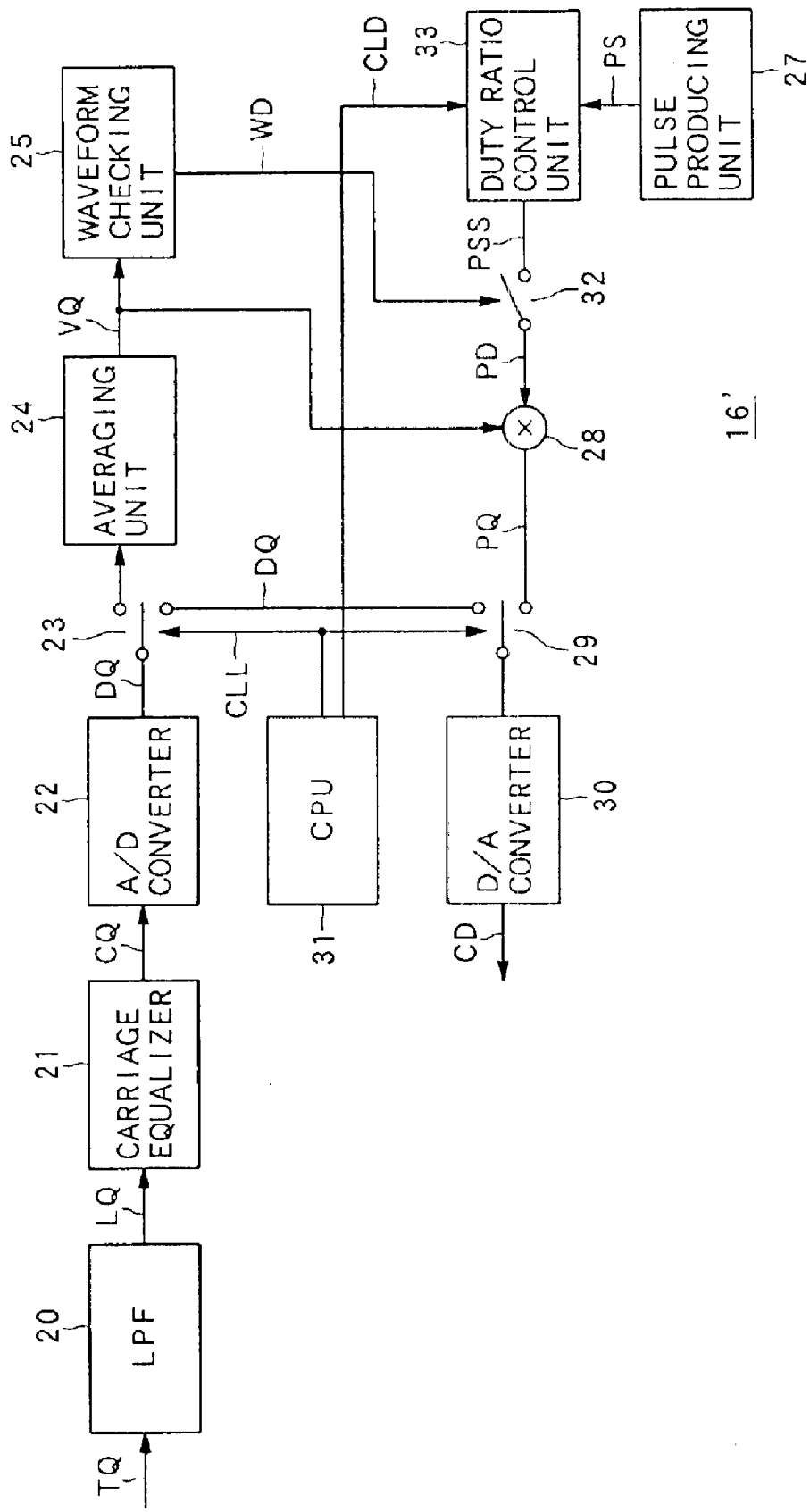
FIG. 4 is a block diagram showing a schematic configuration of a carriage controller of the second embodiment according to the present invention.

The second embodiment of the carriage controller according to the present invention will now be explained using FIGS. 4 and 5. FIG. 4 is a block diagram showing a schematic configuration of the carriage controller 16' of the second embodiment, whilst FIG. 5 exemplifies a waveform diagram showing operations of the carriage controller 16'. Moreover, in FIG. 4, the elements of the carriage controller 16' which are similar or identical to those of the carriage controller 16 of the first embodiment are assigned to the same reference numbers as those in FIG. 3, with their detailed descriptions omitted for the sake of simplicity.

As shown in FIG. 4, the carriage controller 16' comprises a switch 32 arranged between the pulse producing unit 27 (the duty ratio control unit 33) and the multiplier 28, instead of the switch 26 in the carriage controller 16 according to the first embodiment. Meanwhile, the configuration is made such that the averaged equalizer signal VQ from the averaging unit 24 is directly supplied to one input terminal of the multiplier 28. Moreover, the window signal WD output by the waveform checking unit 25 is supplied to the switch 32 as a switching control signal.

Operations of the carriage controller 16' will now be explained.

Under the normal carriage servo control, the control signal CLL from the CPU 31 makes both of the switches 23 and 29 connect to the averaging unit 24 and the multiplier 28, respectively.

At first, the low-pass filter 20, the carriage equalizer 21, the A/D converter 22, and the averaging unit 24 operate in a similar manner to those of the carriage equalizer 16 of the first embodiment, so that the averaged equalizer signal VQ is produced at its final stage. The signal VQ is then sent to both the waveform checking unit 25 and one input terminal of the multiplier 28 (refer to the top left waveform, the top right waveform, and the second waveform from the top right in FIG. 5, respectively).

Like the first embodiment, the CPU 31 produces the control signal CLD for controlling the duty ratio of the pulse signal PQ on the basis of the digital equalizer signal DQ, then supplies the produced signal DQ to the duty ratio control unit 33.

The waveform checking unit 25 produces the window signal WD on the basis of the first and second threshold values in a similar way to the operation performed by the carriage controller 16 of the first embodiment. The window signal WD is then provided to the switch 32 as the control signal.

Figure 5:
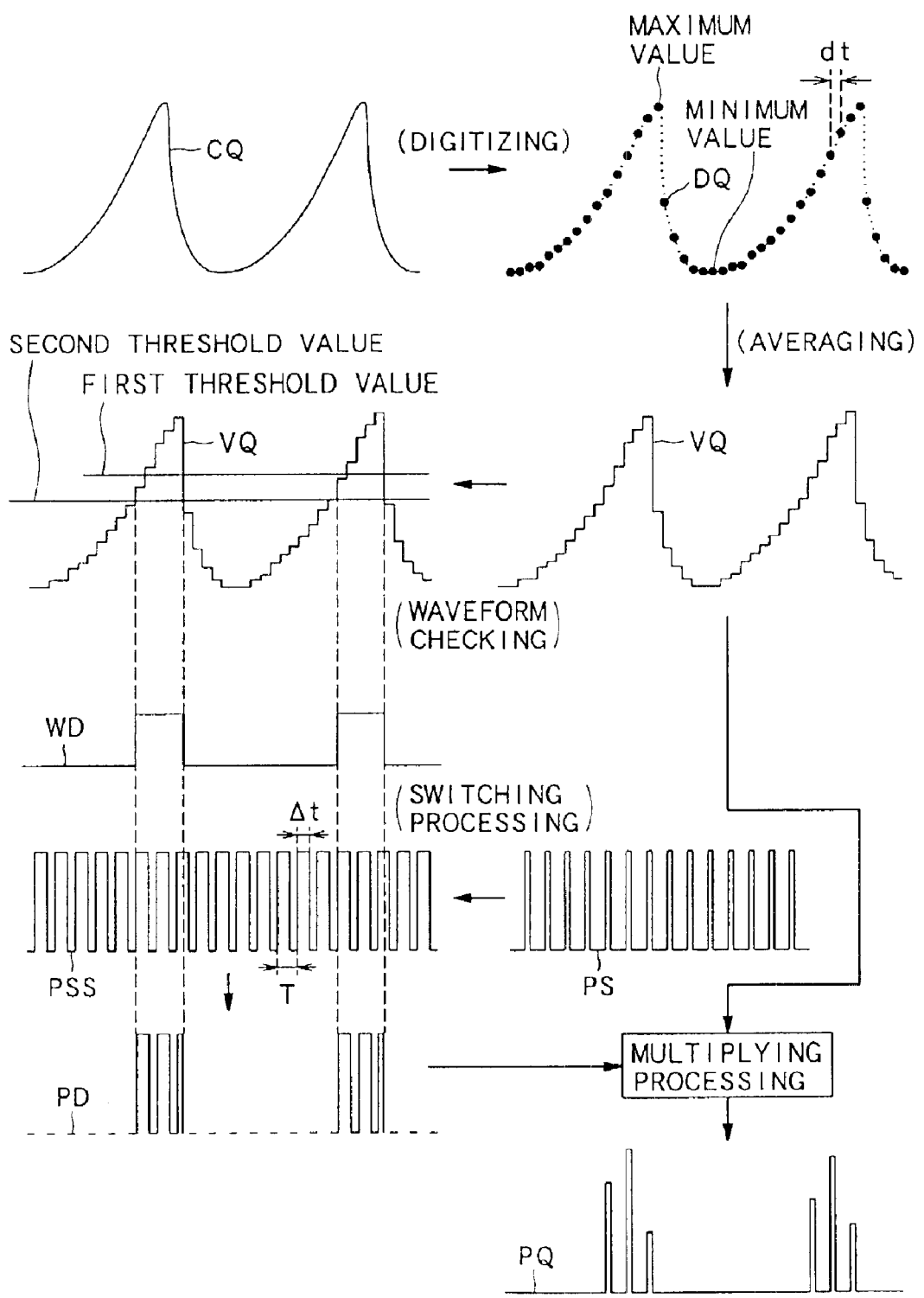
FIG. 5 represents waveform diagrams showing operations of the carriage servo controller according to the second embodiment.

On the other hand, the pulse producing unit 27 continuously produces a pulse signal PS whose period of time and duty ratio are set constant in the similar way to those set by the carriage controller 16 in the first embodiment (refer to the second waveform from the bottom right in FIG. 5). The produced pulse signal PQ is then supplied to the duty ratio control unit 33.

When receiving the outputted pulse signal PS, the duty ratio control unit 33 changes the duty ratio of the pulse signal PS with its period T constant (refer to the second waveform from the bottom left in FIG. 5) in response to the control signal CLD from the CPU 31. Specifically, the duty ratio control unit 33 changes the Δt shown in the second waveform from the bottom left in FIG. 5 in such a manner that the Δt equals an amount represented by the control signal CLD. This control of change produces a changed pulse signal PSS, which is sent to the input terminal of the switch 32.

The switch 32, to which the window signal WD is supplied as the switching control signal, executes switching processing so as to pass the changed pulse signal PSS only during each period in which the window signal WD is "HIGH." Thus, a switching pulse signal PD shown at the bottom left in FIG. 5 is produced, and then sent to one input terminal of the multiplier 28. The switching pulse signal PD thus produced is equal in the duty ratio to the changed pulse signal PSS.

The multiplier 28 multiplies the switching pulse signal PD and the averaged equalizer signal VQ together so as to produce a pulse carriage signal PQ shown at the bottom right in FIG. 5, like the first embodiment. The produced pulse carriage signal PQ is sent to the D/A converter 30 through the switch 29.

The D/A converter 30 converts the pulse carriage signal PQ into an analog signal to make the foregoing carriage control signal CD, before supplying the carriage control signal CD to the driver 7c.

The carriage control signal CD is therefore amplified, with the result that the foregoing carriage drive signal CDD is produced.

As to the timing to change the duty ratio of the changed pulse signal PSS, the same technique as that employed in the first embodiment can be used as one example. In other words, the duty ratio of the changed pulse signal PSS is changed one time before the start of reproduction. Alternatively, it may be possible to configure the carriage equalizer 16' in such a manner that both of the CPU 31 and the duty ratio control unit 33 operate so as to constantly change the duty ratio during the execution of the reproduction.

In the first and second embodiments, particular carriage servo control, which is different from the carriage servo control executed in the normal reproduction of information, can be carried out as well. Such particular carriage servo control includes control executed when a radiated position of the optical beam is jumped over a plurality of tracks at a time, called "track jumping." In cases such particular carriage servo control is required, the control signal CLL from the CPU 31 gives both of the switches 23 and 29 different switching manners. Specifically, the control signal CLL causes not only the switch 23 to switch over to its lower-side-shown output terminal in FIG. 2 or 4, but also the switch 29 to switch over to its upper-side-shown (first) input terminal in FIG. 2 or 4. This switching manner enables the digital equalizer signal DQ produced by the A/D converter 22 to directly be sent to the D/A converter 30 through both the switches 23 and 29. The carriage servo control similar to that of the conventional system can therefore be executed.

As described, the operations of the carriage controllers 16 and 16' according to the first and second embodiments make it possible that the carriage motor 8 is driven based on the controlled pulse carriage signal PQ whose period is constant, duty ratio is optimized, and voltage amplitude corresponds to changes in the averaged equalizer signal VQ. In consequence, drive energy in agreement with designed specifications can be applied to the carriage motor 8, thus making it possible to realize the operations for the carriage serve control based on the designed specifications.

Therefore, it is possible not only to reduce the influence of fluctuations of the carriage servo control, but also to improve the degrees of freedom in designing the carriage servo control.

Viewing differently, to provide the carriage servo control based on any design will lead to the carriage controller 16 of universal type. Namely, the controller 16 configured in the single manner is able to meet a variety of kinds of demands for the carriage servo control. In such a case, an additional design one has to do is adjust the period and duty ratio of the pulse signal PS correspondingly to each demand.

The pulse carriage signal PQ is produced by using the changed pulse signal PSS whose duty ratio is altered correspondingly to a difference between the maximum and minimum values of the tracking error signal TE. It is therefore possible to execute more optimized carriage servo control.

Moreover, the application of the carriage control signal CD is made only during each period of time when the window signal WD is "HIGH." This means that the application of the carriage servo control signal CD is not continuous, thereby suppressing power consumption required for the carriage servo control.

(IV) Modifications

Several modifications related to the present invention will now be explained with reference to FIG. 6.

Figure 6:
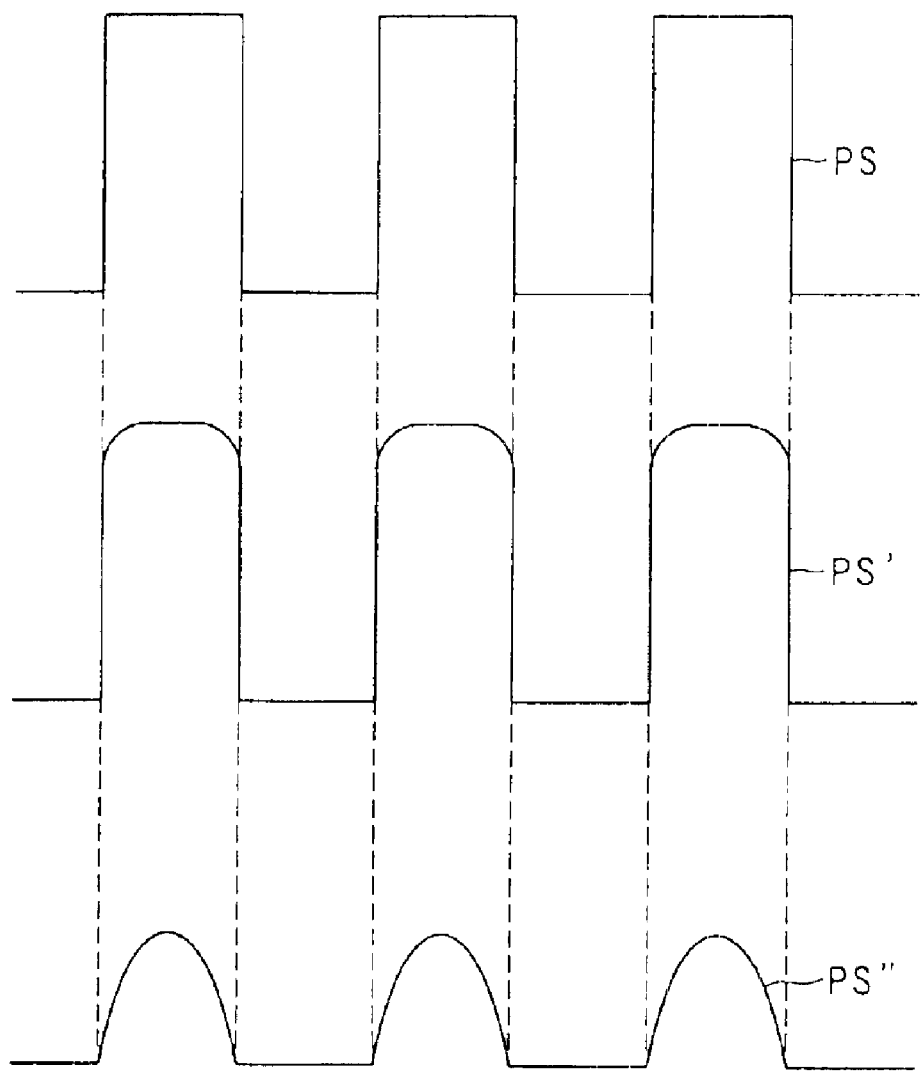
FIG. 6 represents waveform diagrams for explaining a modification that is applicable to the first and second embodiments.

In the foregoing first and second embodiments, a square-wave pulse signal illustrated at the top (a) in FIG. 6 is used as the pulse signal PS, but the present invention is not limited to such pulse signal PS. By way of example, as illustrated at the second waveform (b) in FIG. 6, a pulse signal PS' whose period is the same that of the pulse signal PS but whose waveform is rounded to some extent at both of the edges may be used for producing the pulse carriage signal PQ, as described in the first and second embodiments.

In addition, preferably, as shown at the bottom (c) in FIG. 6, the pulse signal PS" of which waveform is a half-sine-waveform, but whose period is still the same as that of the pulse signal PS, may be used for producing the pulse carriage signal PQ.

The pulse signal PS' or PS" used by the above modifications contains only frequency components less than a predetermined frequency. Higher frequency components included in the carriage control signal CD may cause unwanted vibrations of the pickup 1 in the carriage servo control. However, well design makes it possible to remove the higher frequency components from the carriage control signal CD, provided the pulse signal PS' or PS" is used. The foregoing modifications can therefore give more precision to the carriage servo control, in addition to the various advantages obtained in the foregoing embodiments.

Further, a computer-readable program for causing a processor such as a single general-purpose microcomputer to execute the operations of the carriage controller 16 (16') explained in the first and second embodiments and the modifications can be recorded as program codes on an information recording medium, such as a flexible disc, a hard disc or others. In such a case, the processor such as the single general-purpose microcomputer can be used to form the carriage controller 16 (16').

Furthermore, in the first and second embodiments and the modifications, exemplified is the configuration in which the present invention is applied to the carriage servo control made by the information reproducing system S which reproduces information recorded on the optical disc DK. However the present invention is not limited to such configuration. Alternatively, in cases a recordable optical disc is used to record pieces of information thereon, the present invention may be applied to carriage servo control carried out in detecting from the optical disc address information or others showing recorded positions.

While there has been described what is at present considered to be the preferred embodiments and modifications of the present invention, it will be understood that various modifications which are not described yet may be made therein, and it is intended to cover in the appended claims all such modifications as fall within the true spirit and scope of the invention.

The entire disclosure of Japanese Patent Application No. 2000-307602 filed on Sep. 6, 2000 including the specification, claims, drawings and summary is incorporated herein by reference in its entirety.

What is claimed is:

1. A carriage servo control system for servo-controlling a movement of a carriage device in a vertical direction to a track formed on a recording medium, in which the carriage device has a detecting device mounted thereon for transmitting an optical beam to the track so as to perform at least one of recording and reproduction of information on and from the track, said carriage servo control system comprising:

an error signal producing device for producing an error signal showing an error between a radiated position of the optical beam on the recording medium and a position of the track;

a periodic signal producing device for producing a periodic signal of which period is constant and previously determined so as to correspond to a movement accuracy of the carriage device;

a duty ratio control device for changing a duty ratio of the periodic signal on a basis of characteristic of the error signal produced to produce a changed periodic signal having the duty ratio changed;

a drive signal producing device for producing a drive signal to move the carriage device on a basis of both the changed periodic signal produced and the error signal produced; and a supplying device for supplying the drive signal produced to a moving device configured to move the carriage device in the vertical direction so as to move said carriage device by the moving device on a basis of the drive signal supplied, wherein said duty ratio control device changes the duty ratio based on a difference between a maximum value and a minimum value of the error signal to produce the changed periodic signal.

2. The carriage servo control system according to claim 1, wherein said periodic signal producing device produces the periodic signal made up of only a signal component with a frequency not more than a predetermined frequency.

3. The carriage servo control system according to claim 1, wherein said periodic signal producing device produces the periodic signal made up of only a signal component with a frequency not more than a predetermined frequency.

4. The carriage servo control system according to claim 1, wherein said drive signal producing device produces the drive signal on a basis of a partial error signal and the changed periodic signal, said partial error signal serving as the error signal having a value not less than a predetermined threshold value.

5. The carriage servo control system according to claim 1, wherein said drive signal producing device produces the drive signal on a basis of a partial error signal and the changed periodic signal, said partial error signal serving as the error signal having a value not less than a predetermined threshold value.

6. The carriage servo control system according to claim 2, wherein said drive signal producing device produces the drive signal on a basis of a partial error signal and the changed periodic signal, said partial error signal serving as the error signal having a value not less than a predetermined threshold value.

7. The carriage servo control system according to claim 3, wherein said drive signal producing device produces the drive signal on a basis of a partial error signal and the changed periodic signal, said partial error signal serving as the error signal having a value not less than a predetermined threshold value.

8. The carriage servo control system according to claim 4, wherein said drive signal producing device multiplies the changed periodic signal and the partial error signal produced together to produce the drive signal.

9. The carriage servo control system according to claim 5, wherein said drive signal producing device multiplies the changed periodic signal and the partial error signal produced together to produce the drive signal.

10. The carriage servo control system according to claim 6, wherein said drive signal producing device multiplies the changed periodic signal and the partial error signal produced together to produce the drive signal.

11. The carriage servo control system according to claim 7, wherein said drive signal producing device multiplies the changed periodic signal and the partial error signal produced together to produce the drive signal.

12. The carriage servo control system according to claim 1, wherein said drive signal producing device produces the drive signal on a basis of a partially changed periodic signal and the error signal, said partially changed periodic signal serving as the changed periodic signal and being included within a period previously determined based on the error signal.

13. The carriage servo control system according to claim 1, wherein said drive signal producing device produces the drive signal on a basis of a partially changed periodic signal and the error signal, said partially changed periodic signal serving as the changed periodic signal and being included within a period previously determined based on the error signal.

14. The carriage servo control system according to claim 2, wherein said drive signal producing device produces the drive signal on a basis of a partially changed periodic signal and the error signal, said partially changed periodic signal serving as the changed periodic signal and being included within a period previously determined based on the error signal.

15. The carriage servo control system according to claim 3, wherein said drive signal producing device produces the drive signal on a basis of a partially changed periodic signal and the error signal, said partially changed periodic signal serving as the changed periodic signal and being included within a period previously determined based on the error signal.

16. A carriage servo control system according to claim 12, wherein said drive signal producing device multiplies the partially changed periodic signal and the error signal together to produce the drive signal.

17. A carriage servo control system according to claim 13, wherein said drive signal producing device multiplies the partially changed periodic signal and the error signal together to produce the drive signal.

18. A carriage servo control system according to claim 14, wherein said drive signal producing device multiplies the partially changed periodic signal and the error signal together to produce the drive signal.

19. A carriage servo control system according to claim 15, wherein said drive signal producing device multiplies the partially changed periodic signal and the error signal together to produce the drive signal.

20. A carriage servo control system for servo-controlling a movement of a carriage device in a vertical direction to a track formed on a recording medium, in which the carriage device has a detecting device mounted thereon for transmitting an optical beam to the track so as to perform at least one of recording and reproduction of information on and from the track, said carriage servo control system comprising:

an error signal producing device for producing an error signal showing an error between a radiated position of the optical beam on the recording medium and a position of the track;

a periodic signal producing device for producing a periodic signal of which period is constant and previously determined so as to correspond to a movement accuracy of the carriage device;

a duty ratio control device for changing a duty ratio of the periodic signal on a basis of characteristic of the error signal produced to produce a changed periodic signal having the duty ratio changed;

a drive signal producing device for producing a drive signal to move the carriage device on a basis of both the changed periodic signal produced and the error signal produced; and a supplying device for supplying the drive signal produced to a moving device configured to move the carriage device in the vertical direction so as to move said carriage device by the moving device on a basis of the drive signal supplied, wherein said drive signal producing device produces the drive signal on a basis of a partial error signal and the changed periodic signal, said partial error signal serving as the error signal having a value not less than a predetermined threshold value.

21. A carriage servo control system for servo-controlling a movement of a carriage device in a vertical direction to a track formed on a recording medium, in which the carriage device has a detecting device mounted thereon for transmitting an optical beam to the track so as to perform at least one of recording and reproduction of information on and from the track, said carriage servo control system comprising:

an error signal producing device for producing an error signal showing an error between a radiated position of the optical beam on the recording medium and a position of the track;

a periodic signal producing device for producing a periodic signal of which period is constant and previously determined so as to correspond to a movement accuracy of the carriage device;

a duty ratio control device for changing a duty ratio of the periodic signal on a basis of characteristic of the error signal produced to produce a changed periodic signal having the duty ratio changed;

a drive signal producing device for producing a drive signal to move the carriage device on a basis of both the changed periodic signal produced and the error signal produced; and a supplying device for supplying the drive signal produced to a moving device configured to move the carriage device in the vertical direction so as to move said carriage device by the moving device on a basis of the drive signal supplied, wherein said drive signal producing device produces the drive signal on a basis of a partially changed periodic signal and the error signal, said partially changed periodic signal serving as the changed periodic signal and being included within a period previously determined based on the error signal.

* * * * *